March 12, 1963 A. O. REYNOLDS ETAL 3,080,680
JACKETED FIBRE TRANSPLANTER POT
Filed April 29, 1959 2 Sheets-Sheet 1

INVENTORS
ALFRED O. REYNOLDS,
RICHARD H. PLOW and
BY CHARLES W. SNYDER

Harold B. Hood
ATTORNEY

March 12, 1963  A. O. REYNOLDS ETAL  3,080,680
JACKETED FIBRE TRANSPLANTER POT
Filed April 29, 1959  2 Sheets-Sheet 2
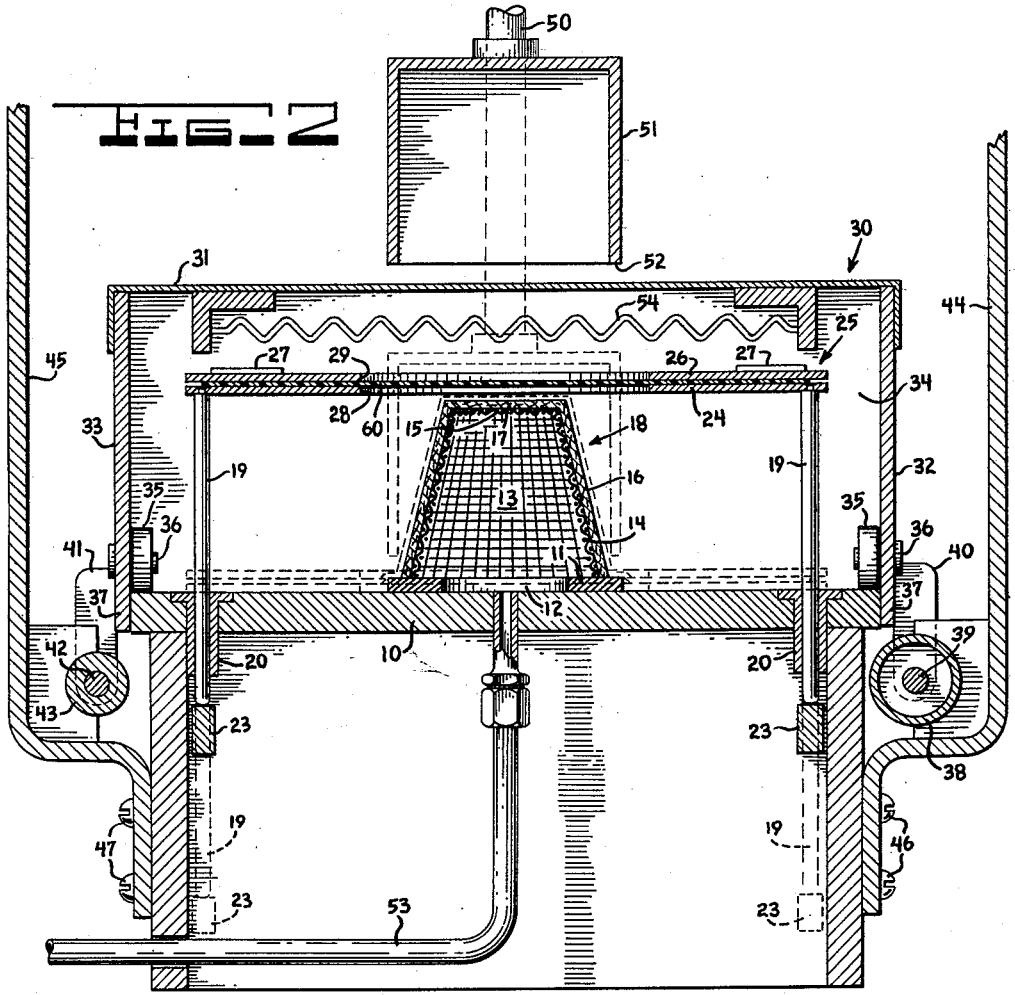
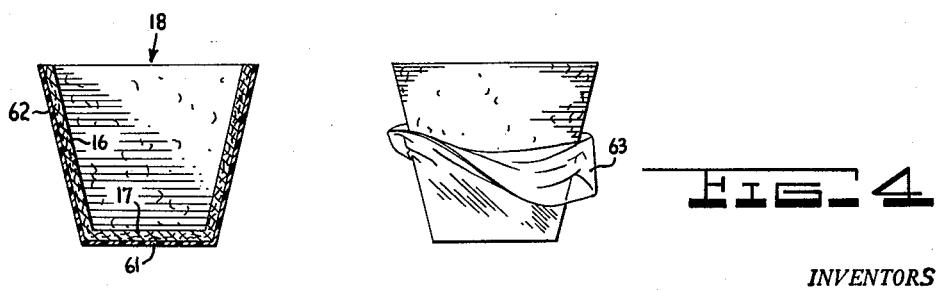
INVENTORS
ALFRED O. REYNOLDS
RICHARD H. PLOW and
BY CHARLES W. SNYDER
Harold B. Hood
ATTORNEY

United States Patent Office 3,080,680
Patented Mar. 12, 1963

3,080,680
JACKETED FIBRE TRANSPLANTER POT
Alfred O. Reynolds, Indianapolis, and Richard H. Plow and Charles W. Snyder, Lebanon, Ind., assignors to Willis-Reynolds Corp., Lebanon, Ind., a corporation of Indiana
Filed Apr. 29, 1959, Ser. No. 809,870
5 Claims. (Cl. 47—37)

The present invention relates to a jacketed container of fibrous, originally air-permeable material, and to a method of producing the same and one suitable form of apparatus for carrying out that method. The primary object of the invention is to provide an improved transplanter pot; but other objects of the invention will appear as the description proceeds and, as will be appreciated from the following specification, the invention is not limited to the field of transplanter pots but is applicable wherever it may be desirable to provide, for an air-permeable article, a reinforcing enrobement.

During recent years the plant pot made of organic fibres has assumed an important place in the horticultral trade. This type of pot most frequently consists of a mixture of peat moss and paper fibres with the former predominating. It can, however, be made of a number of other organic materials.

The type of pot discussed here has two essential features. The first is that the roots of the plant growing inside it readily penetrate the pot wall, and the second is that the pot, when planted in the soil with the plant, decomposes in due course through bacterial action or other decomposing force. The pot may have other desirable features. For instance, most organic fibres, and especially peat moss, will impart to the pot an ability to retain relatively large amounts of moisture and thus create a situation favorable to plant growth. Plant nutrients can be added and the organic fibre, again especially if peat moss is used, will retain relatively large amounts of it and release it gradually so that the plant receives nourishment over an extended period of time and at no time is nutrient released rapidly enough to create a toxic condition.

It has been found that pots of this type offer several advantages to the horticultural business.

Besides avoiding transplant shock, the use of the pot usually provides cost savings by making possible more rapid transplanting with less highly skilled labor, as compared with other methods. This factor tends to become constantly more important as labor costs tend to rise.

It has also been found that these pots frequently provide better and more uniform growth than other methods.

Certain of the properties of these pots tend to make their use particularly desirable for certain specific purposes. For instance, when plants are being held for considerable periods of time on display shelves in retail establishments, they frequently receive rather scant attention. The high moisture and nutrient retention properties of the pot will tend to keep the plant in good condition.

When plants are shipped over long distances, the pot offers the advantage of lightness, which minimizes transportation charges paid on the container. The pot, for reasons stated above, tends also to keep the plant in good condition during transportation when care is impractical.

In both of these specific uses, however, the conventional fibre pot has the serious drawback of comparatively low strength, which has limited its use. Plants on retail shelves are accessible to the public, and it has been found that the breakage caused by rough handling has been costly to the retailer. In the case of shipping the pots have not had enough strength to come through in good shape unless the pot and plants are carefully wrapped and packed. This has frequently added enough to the cost to make the use of the pots impractical.

In certain growing procedures it has been found undesirable to have root penetration in advance of certain operations taking place. For instance, when a plant is to be shipped, if an excessive amount of root growth is outside the pot, serious damage to these roots and thus to the plant, may result from handling.

In the culture of certain of the slower growing plants, it is common practice to immerse the plant's roots, together with the container, in soil or other media in which growth would occur if the plant were not restrained by the container. This is known as "plunging," which is a growing technique used by nurserymen and florists to combine the advantages of pot growing and field culture to a crop. Obviously, when the conventional organic fibre pot is so used, the operation amounts to transplanting, since the roots grow through the pot into the adjacent medium. Furthermore, when such a pot is in contact with a growing medium on both inside and out, bacterial decomposition of the pot progresses much more rapidly than when only the inside is so exposed. Thus, plunging of a plant in such a pot is an uncertain business and may not work out satisfactorily, depending upon local conditions and length of time involved.

Certain attempts have been made to overcome some or all of these defects and thus broaden the field of applicability of the organic fibre pot, but none of these have been commercially wholly acceptable.

It has been our desire to broaden the field of application of the organic fibre pot, and particularly the pot comprising predominately peat moss, to the greatest possible extent. After many years of experimentation, we have discovered that this may best be done by applying a removable plastic coating, skin or enrobement to the outside of the pot.

This may be done in any one of several ways. For instance, a plastic film-forming material may be dissolved in a solvent and painted on the surface. Water emulsions of plastic film-forming materials may be similarly used. A "plastisol" may be applied in liquid form and heat "cured" to form a plastic film. A jacket may be molded separately and applied to the pot.

Our preferred method is to soften a sheet of thermoplastic material, such as, for instance, polyethylene or polypropylene, with heat, and then to form it around the pot using vacuum according to our own modification of a process commonly known as "drape forming." By this means a very thin sheet of plastic, of the order of .00025" to .020" may be formed over the pot so that it fits snugly and adheres well. Such a sheet may be very readily removed in one piece by holding it at one or two points around the rim and pulling downward.

In developing the technique for applying such a film, we were told by a number of people having skill in the art that the operation was not practical because of the deep draw involved. We made the discovery, however, that the porosity of the pot wall permits vacuum to be applied through it. Utilizing this obscure fact, we have been able to invent a process which permits the enrobement to be pulled closely about the exterior wall of the pot to give a very satisfactory result. The same porosity feature also makes possible the use of pressure molding in forming a tightly fitting skin around the pot, since it relieves air trapped in the inter-face.

For purely ultilitarian results, we find that enrobements made from the standard grades of polyethylene now commercially available, and of thickness toward the lower end of the range mentioned above, are usually satisfactory. Pots so enrobed reduce retail shelf damage to a negligible point. They provide shipping containers having adequate strength for practically all situations encountered in normal transportation. They deflect roots which penetrate the pot wall, and cause them to continue to grow in the inter-face between the pot and the skin. Thus, the roots are there and ready to grow out into the soil the moment the external film is removed and the plant transplanted. Such enrobements have good resistance to soil deterioration on plunging and restrain the roots at the same time that they are protecting the pot from deterioration attack from the exterior. They maintain a closely formed root ball so that even though the plunging should be continued so long that the original pot becomes deteriorated from the inside before lifting, a well formed and easily managed root ball will have been formed and the plant can still be handled as if the pot were still there, with much the same results.

Thus, the plastic coatings described above overcome the faults of the mentioned organic pot in practically every case.

In the accompanying drawings, we have illustrated one form of apparatus whereby the enshrouded pot above-described may readily be produced in accordance with a method or procedure which is deemed to be novel; but attention is called to the fact that the drawings are illustrative only and that change may be made in the specific construction illustrated and described so long as the scope of the appended claims is not violated.

FIG. 2 is a transverse section taken substantially on the line 2—2 of FIG. 1 and looking in the direction of the arrows;

FIG. 3 is a vertical section through an article constructed in accordance with the present invention, with the thickness of its enrobement largely exaggerated for clarity of illustration; and FIG. 4 is an elevation, showing the enrobement partially stripped from the article of FIG. 3.

Figure 1:
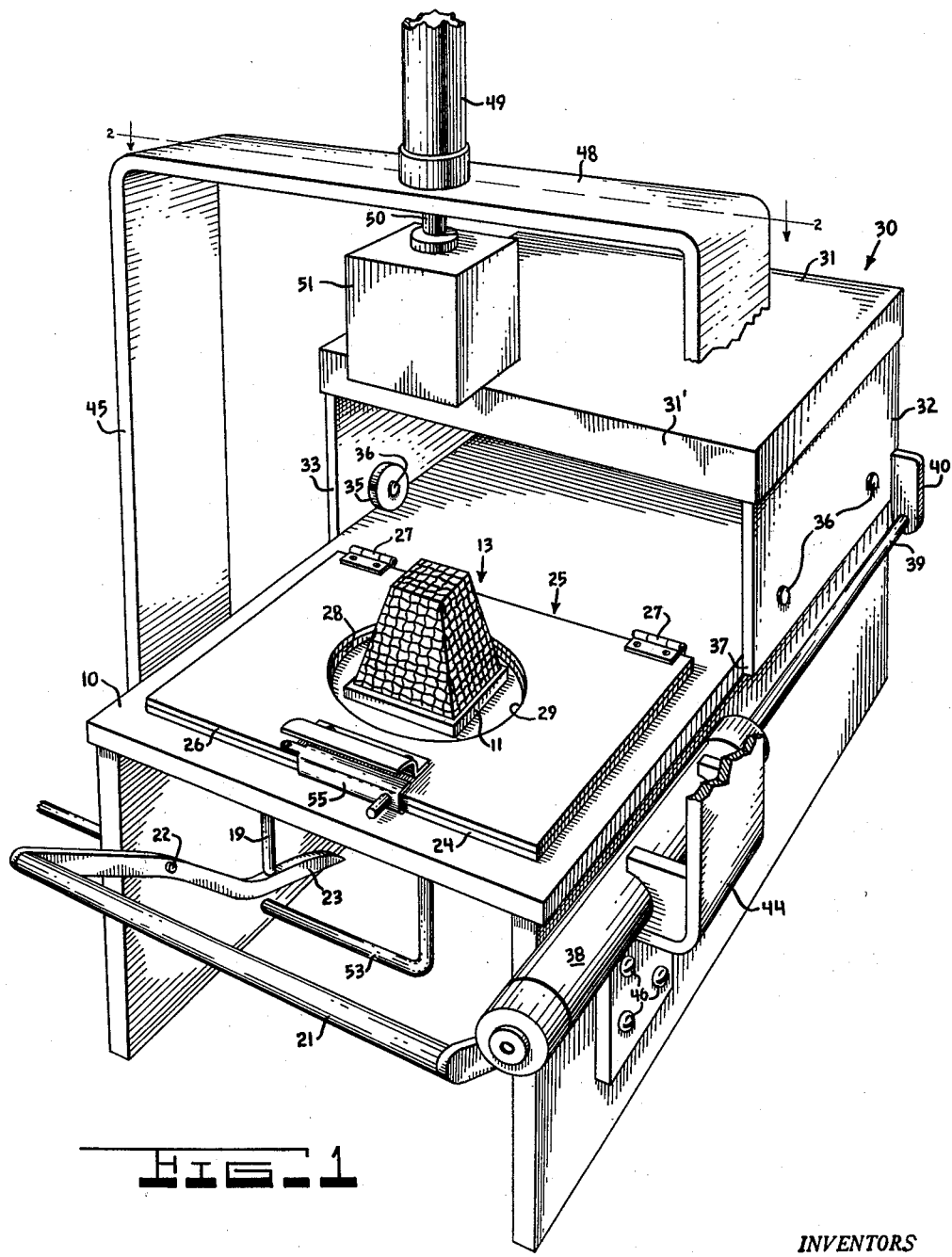
FIG. 1 is a perspective view of such an apparatus.

Referring more particularly to the drawings, it will be seen that the illustrated apparatus comprises a table 10 mounted upon suitable supports and carrying a block 11 which, together with the table top, can cooperate with a pot or similar device to define a chamber 12. Secured to the block 11 is a support or form 13 which, in the illustrated embodiment of the invention, is substantially pyramidal and comprises side walls 14 and an end or bottom wall 15 which is upwardly presented. The support 13 is formed of air-permeable material which, in the claims appended hereto, is sometimes referred to as a foraminous material, that term being intended in its broadest sense to include reticular, perforated or porous material. In the illustrated embodiment of the apparatus, the form is shown as being made of metal screening.

The support or form 13 is so designed as to conform substantially to the internal contours of an article to be enshrouded such as, for instance, the fibrous pot, indicated generally by the reference numeral 18 and comprising a bottom wall 17 and flaring side walls 16. In the particular field as to which this invention is here being described, transplanter pots are usually frusto-conical or frusto-pyramidal. However, whatever may be the internal shape of the article to be enshrouded, the support 13 will be correspondingly formed in order to support the walls of the article against deformation or mutilation under the pressure differential later to be explained.

Grouped about the form 13 is a plurality of rods 19, slidably guided in sleeves or bushings 20 which penetrate the table top 10, for reciprocation on axes parallel to the axis of the support 13. In the present instance, four such rods are provided, though only two are shown. At their upper ends, the rods 19 support the lower leaf 24 of a hinged frame, indicated generally by the reference numeral 25, and comprising further an upper leaf 26 hingedly connected, at one edge, to the leaf 24, as at 27, whereby the leaf 26 is supported upon the leaf 24. The leaf 24 is formed with an aperture 28 in its central region and the leaf 26 is formed with a registering aperture 29, the frame 25 being so arranged that the apertures 28 and 29 register with the support 13 and are large enough to pass said support therethrough.

A treadle 21 is pivotally mounted upon studs 22 carried by the table supports and is formed to provide arms 23 which operatively engage at least two of the rods 19 at the lower ends thereof, the construction being such that, when the treadle 21 is depressed, the rods 19 will be elevated and when the treadle 21 is released, the rods 19 will descend. A push-pull connection can be provided between the arms 23 and the rods 19 if such a connection is deemed necessary; but we presently believe that gravity will be sufficient to move the frame 25 downwardly.

An oven, indicated generally by the reference numeral 30, is suitably supported upon the table 10, the arrangement being such as to provide for relative movement between the oven 30 and the frame 25 whereby the frame may be, at times, enveloped within the oven and subjected to the heating influence thereof. In the illustrated embodiment of the invention, the oven 30 comprises a roof 31, side walls 32 and 33 and a rear wall 34, the front of the oven being open except for the provision depending flange 31'. The open front of the oven is sufficiently high to clear the top of the form 13 and of a pot 18 supported thereon. As shown, the oven is supported on a plurality of wheels or rollers 35 which bear upon the table top 10 and which are carried upon studs or stub axles 36 penetrating the walls 32 and 33 of the oven; and preferably those walls are formed to provide depending skirts 37, 37 which respectively bear against the lateral edges of the table top 10 to guide the oven 30 in its movement relative to the table top. Suitable means, such as the electric heating element 54, is provided for maintaining desired temperature conditions within the oven 30.

We prefer to provide a fluid motor comprising a cylinder 38 fixed to a table support and a piston (not shown) reciprocable in said cylinder and having a stem 39 operatively connected to an ear 40 secured to the oven 30. Preferably, a similar ear 41 projects from the opposite side of the oven and carries a rod 42 which is slidably guided in a suitable bearing 43 fixed with respect to the table top.

A U-shaped frame comprises depending legs 44 and 45 fixed to the lateral supports for the table top by means such as the screws 46 and 47; including also a base 48 which spans the table top and is located well above the parts heretofore described. Said base 48 supports a fluid motor 49 which includes a piston stem 50 carrying, at its lower end, a hollow, suitably vented box 51 whose lower edge 52 is proportioned and designed closely to circumscribe the base of a pot 18 when said box is lowered to its dotted line position illustrated in FIG. 2. Functionally, the edge 52 of the box 51 comprises ring means, and it will be obvious as the description proceeds that the function of that ring means could be accomplished as well by a spider-supported, shallow, perimetrally continuous element.

In operation a pot to be enshrouded is located upon the support 13 in the relationship illustrated in FIG. 2. Now, the leaf 26 of the frame 25 is lifted, and a suitably proportioned sheet 60 of selected material such as the polyethylene or polyproplene above-mentioned, is laid in place on the leaf 24 to span the aperture 28. Now, the leaf 26 is closed upon the sheet 60 and is latched to the leaf 24 by any suitable means such as that indicated at 55 in FIG. 1, whereby the sheet 60 is perimetrally gripped between the leaves 24 and 26 to prevent any substantial slipping of the perimetral regions of the sheet with respect to the frame 25. Of course, that frame is in its elevated, solid line position shown in FIG. 2.

Now, the motor 38 is actuated to shift the oven 30 forwardly until the frame is enveloped within the oven; and that relationship of the parts is maintained until that portion of the sheet 60 which spans the apertures 28 and 29 has been heated to a drawing temperature. Now, the oven is returned to its illustrated position and the treadle 21 is released whereby the frame 25 will descend to its dotted line position illustrated in FIG. 2. As the frame descends, the mid-portion of the sheet 60 engages and is arrested by the bottom wall 17 of the pot 18; and as the frame continues to descend, that portion of the sheet 60 which spans the apertures 28 and 29 will be drawn into surrounding relationship to the side walls 16 of the pot. When the frame has reached a position such that the perimetral portions of the sheet 60 are beneath the rim of the pot 18, the ring means 51 will be lowered, by actuation of the motor 49, whereby the rim 52 of the box 51 will engage the sheet 60 to complete the draw thereof and to move the downwardly extending portions of the sheet into close adjacency with the walls 16 of the pot. Now, valve means (not shown) in the pipe 53 will be opened to evacuate the interior of the chamber 12 and of the support 13. Thus, air entrapped between the sheet 60 and the outer surface of the pot 18 will be caused to flow through the pot walls and the sheet will be pressed into intimate engagement with the external surfaces of the pot. In some instances and with some types of plastic sheets, it may be feasible to dispense with the use of the ring means 52.

It will be appreciated that this action can be achieved either by evacuating the interior of the support 13 or by exerting super-atmospheric pressure upon the external surface of the sheet 60. The essential requirement is that a pressure differential shall be established between the external surface of the sheet 60 and the internal surfaces of the pot 18 whereby fluid entrapped between the sheet and the pot will be forced through the pot walls.

After partial cooling of the sheet 60, the vacuum can be released, and the treadle 21 will be actuated to lift the frame 25. This will lift the sheet 60; and its adherence to the pot 18 will be sufficient to lift the pot off the support 13. Now, the frame is opened and the sheet, with the enshrouded pot adhering thereto, may be removed. Excessive quantities of the sheet can be trimmed away to produce the article illustrated in FIG. 3.

It is found that the enrobement which is thus produced effectively strengthens the relatively fragile pot to protect it against damage in ordinary handling, and that the skin will effectively adhere to the pot throughout normal handling, plunging and the like. It is further found that, as plants grow in the pots, rootlets will force their way through the walls of the pot, just as they do in the use of conventional fibrous pots, and that the degree of adherence of the enrobement to the pot is such that the rootlets can continue to grow in the interface between the skin and the pot, but will not force their way through the skin. Thus, rootlets which have forced their way through the pot walls are effectively protected against mechanical damage during handling of the potted plant, and are retained against major extension into the surrounding medium during plunging.

As is seen in FIG. 3, the enrobement comprises a portion 61 which is adherent to the bottom wall 17 of the pot and portions 62 which are smoothly adherent to the side walls 16 of the pot. It is further found, however, that by deliberate manipulation, the upper edge of the skin can be readily released from the rim of the pot and, being gripped at one or more points in its circumference, a downward force exerted upon that edge will readily release the enrobement, without tearing and without damage to the pot, from the pot walls in the manner suggested at 63 in FIG. 4.

As is suggested above, while we prefer to use an imperforate skin or one which is formed with one or two perforations in its bottom portion 61 only, in most applications, where "maximum breathing" is desirable, we may use perforated sheets or we may use an expanded extruded sheet which, it is found, tears somewhat heterogeneously as it is being drawn to provide openings scattered over the surface of the completed article.

It will be apparent that, when the completed article is removed from the frame 25, those portions of the sheet 60 which were gripped between the leaves 24 and 26 will dangle loosely beyond the rim of the pot. In most instances, those portions will be trimmed away to produce an article having the appearance of FIG. 3; but such loose portions of the sheet may be left lying open or may be folded downwardly during growth of a plant in the pot. At any time that is suitable, during growth of the plant, that loose sheet material may be brought inward over the top of the pot, gathered about the stem of the plant and fastened with any suitable tie, such as string, pressure-sensitive tape, a twisted strip of soft metal, or the like.

It will be appreciated, of course, that the machine herein illustrated and described, can be constructed to enshroud any desired plurality of pots in a single cycle, by merely duplicating the forms 13 and extending the frame 25 and the oven 30 to cooperate with a battery of such forms. Alternatively, a substantial plurality of pots might be molded in blocks, the pots of each block being joined together at their rims. Such blocks will nest for shipment and storage as do individual pots, and would be highly economical to manufacture and to use in block form.

In some instances, it may be preferable to refrain from heating the article to be enrobed. In such instances, the sheet-carrying frame may be moved away from the form 13 for envelopment in the oven and, in fact, the oven 30 may be stationary while the frame 25 may be moved away from the support 13 and into the oven for heating, being returned, then, to registry with the support 13 for carrying out the drawing and pressure-applying step. In such cases, it might be necessary to heat the sheet 60 to a slightly higher temperature in order to avoid excessive cooling during the drawing step.

We claim as our invention:

1. As an article of manufacture, a pot formed predominantly of matted organic fibre and provided exteriorly with a closely-fitting, substantially inelastic enrobement of synthetic plastic material having a tensile strength substantially exceeding the wet strength of the fibre pot body, the material of said enrobement shallowly permeating the external, fibrous surface of said pot to embed fibers within such material, whereby the enrobement adheres tenaciously to the external surface of the pot without exerting a radially-inward force upon the pot body.

2. The article of claim 1 in which said enrobement is a film having a thickness within the range from 0.00025" to 0.020", said film being bodily strippable from said pot.

3. The article of claim 1 in which said enrobement is a film of sheet material selected from the group which consists of polyethylene and polypropylene, said film being bodily strippable from said pot.

4. The article of claim 1 in which said enrobement is a film of sheet material selected from the group which consists of polyethylene and polypropylene, said film having a thickness within the range from 0.00025″ to 0.020″, and being bodily strippable from said pot.

5. The article of claim 1 in which said enrobement is a film of material substantially impervious to moisture, such material being substantially impervious to root growth therethrough while being capable of partial separation from said body surface to permit root growth within the interface between said pot body and said enrobement.

References Cited in the file of this patent

UNITED STATES PATENTS

| | | |
|---|---|---|
| 1,785,101 | Sutherland | Dec. 16, 1930 |
| 2,076,450 | Doty | Apr. 6, 1937 |
| 2,094,513 | Wilson et al. | Sept. 28, 1937 |
| 2,440,569 | Baldwin | Apr. 27, 1948 |
| 2,728,169 | Spengler | Dec. 27, 1955 |
| 2,765,493 | Winstead | Oct. 9, 1956 |
| 2,777,165 | Hurt | Jan. 15, 1957 |
| 2,814,077 | Moncrieff | Nov. 26, 1957 |
| 2,836,852 | Butzko | June 3, 1958 |
| 2,884,741 | Lange | May 5, 1959 |

FOREIGN PATENTS

| | | |
|---|---|---|
| 728,930 | Great Britain | Apr. 27, 1955 |